(12) United States Patent
Tsuria

(10) Patent No.: US 6,405,369 B1
(45) Date of Patent: Jun. 11, 2002

(54) SMART CARD CHAINING IN PAY TELEVISION SYSTEMS

(75) Inventor: Yossef Tsuria, Shoham (IL)

(73) Assignee: News Datacom Limited, London (GB)

(*) Notice: Subject to any disclaimer, the term of this patent is extended or adjusted under 35 U.S.C. 154(b) by 0 days.

(21) Appl. No.: 08/875,868

(22) PCT Filed: Jan. 23, 1997

(86) PCT No.: PCT/IL97/00031
§ 371 (c)(1),
(2), (4) Date: Apr. 3, 1998

(87) PCT Pub. No.: WO97/35430
PCT Pub. Date: Sep. 25, 1997

(30) Foreign Application Priority Data

Mar. 18, 1996 (IL) .................................................. 117547
Oct. 29, 1996 (GB) ............................................. 9622458

(51) Int. Cl.⁷ .............................. H04N 7/16; H04N 9/00
(52) U.S. Cl. ................................ 725/6; 725/5; 725/25; 725/27; 380/210; 380/211
(58) Field of Search ............................... 380/10, 21, 9, 380/22, 23, 210, 211, 241; 348/12, 13, 10, 6; 455/3.1, 6.1, 6.2, 6.3, 5.1; 235/282; 725/1, 5, 6, 8, 25, 27, 31, 104, 100, 131, 132, 139, 140, 151, 152; H04N 7/10, 7/04

(56) References Cited

U.S. PATENT DOCUMENTS

| | | | |
|---|---|---|---|
| 3,996,450 A | 12/1976 | Kerkhoff | 235/61.7 B |
| 4,325,078 A | 4/1982 | Seaton et al. | 380/16 |
| 4,450,535 A | 5/1984 | de Pommery et al. | 364/900 |
| 4,594,663 A | 6/1986 | Nagata et al. | |
| 4,613,901 A | 9/1986 | Gilhousen et al. | 380/20 |
| 4,709,136 A | 11/1987 | Watanabe | |
| 4,718,107 A | 1/1988 | Hayes | 455/4 |
| 4,751,732 A | 6/1988 | Kamitake | 380/20 |

(List continued on next page.)

FOREIGN PATENT DOCUMENTS

| | | | |
|---|---|---|---|
| EP | 0562295 | 9/1993 | H04N/7/167 |
| EP | 0570785 | 11/1993 | H04N/7/16 |
| EP | 683613 | 11/1995 | |
| EP | 0706291 | 4/1996 | H04N/7/16 |
| EP | 95 11 5554 | 1/1997 | |
| GB | 2261580 A | 5/1993 | H04N/7/16 |
| WO | WO 89/08899 | 9/1989 | |

OTHER PUBLICATIONS

Futro, A.T., Smart Card for Conditional Access: A Marketing and Security Tool, Cable TV Sessions, Montreux, Jun. 10–15, 1993, No. Symp. 18, 11, Jun. 1993, pp. 773–742.

G. Monnin, Smart Cards for Conditional Access: A Security and Marketing Tool Smartcrypt: The Pay–TV System from Schulmberger, 18th Int'l TV Symp., Montreux, Switz., Jun. 1993, pp. 743–757.

Primary Examiner—Andrew Faile
Assistant Examiner—Vivek Srivastava
(74) Attorney, Agent, or Firm—Ladas & Parry

(57) ABSTRACT

A pay television system including a pay television network and a subscriber unit which receives pay television transmissions via the pay television network and displays the pay television transmissions on televisions coupled thereto. The subscriber unit includes at least two pay television decoders, wherein a first decoder includes a first card reader and a second decoder includes a second card reader. The system also includes a first smart card which is operative, upon insertion in a first slot in the first card reader, to activate decoding of the pay television transmissions in the first decoder and a second smart card which is operative, upon insertion in a second slot in the second card reader, to activate decoding of the pay television transmissions in the second decoder. The second smart card deactivates in accordance with predetermined criteria and reactivates upon insertion in the first slot in the first card reader after removal of the first smart card from the first card reader.

50 Claims, 3 Drawing Sheets

U.S. PATENT DOCUMENTS

| | | | |
|---|---|---|---|
| 4,768,229 A | 8/1988 | Benjamin et al. | 380/20 |
| 4,870,261 A | 9/1989 | Mancini et al. | 235/382 |
| 4,908,834 A | 3/1990 | Wiedemer | 380/5 |
| 4,993,066 A | 2/1991 | Jenkins | 380/16 |
| 5,010,571 A | 4/1991 | Katznelson | |
| 5,060,079 A | 10/1991 | Rufus-Isaacs | 358/349 |
| 5,065,429 A | 11/1991 | Lang | 380/25 |
| 5,111,504 A | 5/1992 | Esserman et al. | 380/21 |
| 5,214,699 A | 5/1993 | Monroe et al. | 380/23 |
| 5,243,175 A | 9/1993 | Kato | 235/435 |
| 5,272,753 A | 12/1993 | Nakayama et al. | 380/23 |
| 5,282,249 A | 1/1994 | Cohen et al. | 380/23 |
| 5,319,705 A | 6/1994 | Halter et al. | 380/4 |
| 5,337,358 A | 8/1994 | Alexrod et al. | 380/23 |
| 5,428,685 A | 6/1995 | Kadooka et al. | 380/25 |
| 5,481,609 A | 1/1996 | Cohen et al. | 380/16 |
| 5,509,073 A | 4/1996 | Monnin | 380/20 |
| 5,526,428 A | 6/1996 | Arnold | 380/25 |
| 5,534,857 A | 7/1996 | Laing et al. | 340/825.34 |
| 5,553,155 A | 9/1996 | Kuhns et al. | 340/825.31 X |
| 5,559,885 A | 9/1996 | Dexler et al. | 380/23 |
| 5,602,915 A * | 2/1997 | Campana et al. | 380/21 |
| 5,629,508 A | 5/1997 | Findley, Jr. et al. | 235/380 X |
| 5,666,412 A | 9/1997 | Handelman et al. | 380/4 |
| 5,742,680 A * | 4/1998 | Wilson | 380/16 |
| 5,748,732 A * | 5/1998 | Le Berre et al. | 380/10 |
| 5,757,909 A * | 5/1998 | Park | 380/5 |
| 6,035,037 A * | 3/2000 | Chaney | 380/10 |
| 6,104,860 A * | 8/2000 | Lee et al. | 386/94 |

\* cited by examiner

SMART CARD CHAINING IN PAY TELEVISION SYSTEMS

FIELD OF THE INVENTION

The present invention relates to pay television systems generally and more particularly to systems for controlling access to pay television transmissions.

BACKGROUND OF THE INVENTION

Many pay television systems today employ "smart cards" which are cards of the size of credit cards that include integrated circuits (IC). Typically, the smart cards are used to enable access to television transmissions. In such a case, a subscriber inserts a smart card in a slot in a cable television decoder to allow access to television transmissions.

Usually, one smart card is associated with one television (TV) set and the subscriber receives one smart card upon payment of a subscription fee. The subscriber may also purchase, at a reduced price, additional smart cards for use with other TV sets in his house.

In such a case, there is a possibility that the subscriber may try to purchase many cards, and sell most of them to other people at a price which is lower than the regular price, but higher than the price that the subscriber has paid for them. This may cause substantial losses to operators of television transmission systems.

In a co-pending U.S. patent application to Doron Handelman et al., Ser. No. 08/375,995 filed on Jan. 20, 1995, entitled "Secure Access Systems", and assigned to the same assignee as the present application, as well as in corresponding European application 95115554.8 filed on Oct. 2, 1995, there is described a parental control system which utilizes two smart cards that are inserted in a decoder. When one of the cards, which is a main card, is inserted in the decoder, access is enabled to non-restricted programs only. When both cards are inserted in the decoder, access is enabled to restricted programs as well as to non-restricted programs.

SUMMARY OF THE INVENTION

The present invention seeks to provide systems and methods for controlling access to pay television transmissions at a site in which a plurality of pay television decoders are placed.

There is thus provided in accordance with a preferred embodiment of the present invention a pay television system including:

a pay television network;

a subscriber unit which receives pay television transmissions via the pay television network and displays the pay television transmissions on televisions coupled thereto, the subscriber unit including at least two pay television decoders, wherein a first decoder includes a first card reader and a second decoder includes a second card reader;

a first smart card which is operative, upon insertion in a first slot in the first card reader, to activate decoding of the pay television transmissions in the first decoder; and a second smart card which is operative, upon insertion in a second slot in the second card reader, to activate decoding of the pay television transmissions in the second decoder, wherein the second smart card is operable to deactivate in accordance with predetermined criteria, and to reactivate upon insertion in the first slot in the first card reader after removal of the first smart card from the first card reader.

Preferably, the predetermined criteria include at least one of a predetermined time and a predetermined date.

In accordance with a preferred embodiment of the present invention the predetermined criteria include a predetermined date, and the first smart card is operable to deactivate at a first deactivation date, the second smart card is operable to deactivate at a second deactivation date, and the first deactivation date is later than the second deactivation date.

Preferably, at least one of the first smart card and the second smart card is also operable to control access to a video-cassette-recorder for recording pay television transmissions.

Further in accordance with a preferred embodiment of the present invention the second smart card receives, upon reactivation, a new deactivation date which is later than the second deactivation date. The new deactivation date is provided by one of the first decoder, the first smart card and a pay television headend.

Preferably, the new deactivation date is provided by adding a time increment to a current system time, and calculation of the new deactivation date is performed at one of the first decoder, the first smart card, and the headend.

In accordance with a preferred embodiment of the present invention reactivation of the second smart card includes transmission of chaining data, the chaining data including one of a signature, a key and a seed which is operable to at least one of validate, identify, verify and authenticate the second smart card. The chaining data also includes a digital representation of a time increment which is associated with a current system time to provide a deactivation date.

In a preferred embodiment of the invention the one of a signature, a key and a seed is identical for the first smart card and for the second smart card.

Further in accordance with a preferred embodiment of the present invention the predetermined criteria include a predetermined date, and the second smart card is operable to deactivate at any time of day during the predetermined date.

In a preferred embodiment of the present invention the first smart card and the second smart card are interchangeable.

There is also provided in accordance with a preferred embodiment of the present invention a pay television decoder including:

a smart card reader including a smart card slot via which a first smart card is read;

a decoder memory, coupled to the smart card reader, which is operable to store one of a signature, a key and a seed identifying the first smart card; and a decoder processor, coupled to the decoder memory, which is operable to calculate a deactivation date based on data received from one of the first smart card, a pay television headend and the decoder memory, wherein the decoder processor is operable to provide the deactivation date to a second smart card, when the second smart card is inserted in the smart card slot and read via the smart card reader, in response to a match between the one of a signature, a key and a seed identifying the first smart card and a corresponding one of a signature, a key and a seed identifying the second smart card.

In accordance with another preferred embodiment of the present invention there is provided a pay television decoder including:

a smart card reader including a smart card slot via which a first smart card is read; and a decoder memory, coupled to the smart card reader, which is operable:
  to store a deactivation date of a second smart card, and one of a signature, a key and a seed identifying the first smart card,
  to provide the one of a signature, a key and a seed identifying the first smart card to the second smart card, when the second smart card is inserted in the smart card slot in the smart card reader, in response to a first instruction transmitted by the second smart card, and
  to provide the deactivation date to the second smart card in response to a second instruction transmitted by the second smart card.

Preferably, the second instruction is transmitted in response to a match between the one of a signature, a key and a seed identifying the first smart card, and a corresponding one of a signature, a key and a seed identifying the second smart card.

There is also provided in accordance with a preferred embodiment of the present invention a pay television access control method to be employed in a pay television system in which pay television programs are transmitted to a plurality of subscribers, each being entitled to receive selected programs, the method including:
  providing a first decoder activated by a first smart card to decode pay television transmissions, and a second decoder activated by a second smart card to decode pay television transmissions;
  deactivating the second smart card in accordance with predetermined criteria;
  removing the first smart card from a first card reader in the first decoder; and
  reactivating the second smart card by inserting the second smart card in the first card reader of the first decoder.

Preferably, the predetermined criteria include at least one of a predetermined time and a predetermined date.

Further in accordance with a preferred embodiment of the present invention the predetermined criteria include a predetermined date, and the method includes deactivating the first smart card at a first deactivation date, and deactivating the second smart card at a second deactivation date, wherein the first deactivation date is later than the second deactivation date.

Preferably, the method also includes supplying a new deactivation date to the second smart card upon reactivation. The supplying step includes adding a time increment to a current system time.

There is also provided in accordance with a preferred embodiment of the present invention a pay television access control method including:
  providing, in a pay television decoder, a smart card reader including a smart card slot via which a first smart card is read, and a decoder memory, coupled to the smart card reader, which is operable to store one of a signature, a key and a seed identifying the first smart card;
  coupling, to the decoder memory, a decoder processor which is operable to calculate a deactivation date based on data received from one of the first smart card, a pay television headend and the decoder memory;
  inserting in the smart card slot in the smart card reader a second smart card; and
  providing the deactivation date to the second smart card in response to a match between the one of a signature, a key and a seed identifying the first smart card and a corresponding one of a signature, a key and a seed identifying the second smart card.

In accordance with another preferred embodiment of the present invention there is provided a pay television access control method including:
  providing, in a pay television decoder, a smart card reader including a smart card slot via which a first smart card is read, and a decoder memory coupled to the smart card reader;
  storing, in the decoder memory, a deactivation date of a second smart card, and one of a signature, a key and a seed identifying the first smart card;
  inserting the second smart card in the smart card slot in the smart card reader;
  supplying the one of a signature, a key and a seed identifying the first smart card to the second smart card in response to a first instruction transmitted by the second smart card; and
  transmitting the deactivation date to the second smart card in response to a second instruction generated by the second smart card.

Further in accordance with another preferred embodiment of the present invention there is provided a pay television access control method including:
  providing a decoder including a decoder memory and a smart card reader;
  inserting a first smart card in the smart card reader;
  transferring, from the first smart card to the decoder memory, chaining data for activating a second smart card;
  removing the first smart card from the smart card reader;
  inserting the second smart card in the smart card reader;
  transmitting, from the decoder memory to the second smart card, the chaining data; and
  enabling the chaining data to activate the second smart card.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
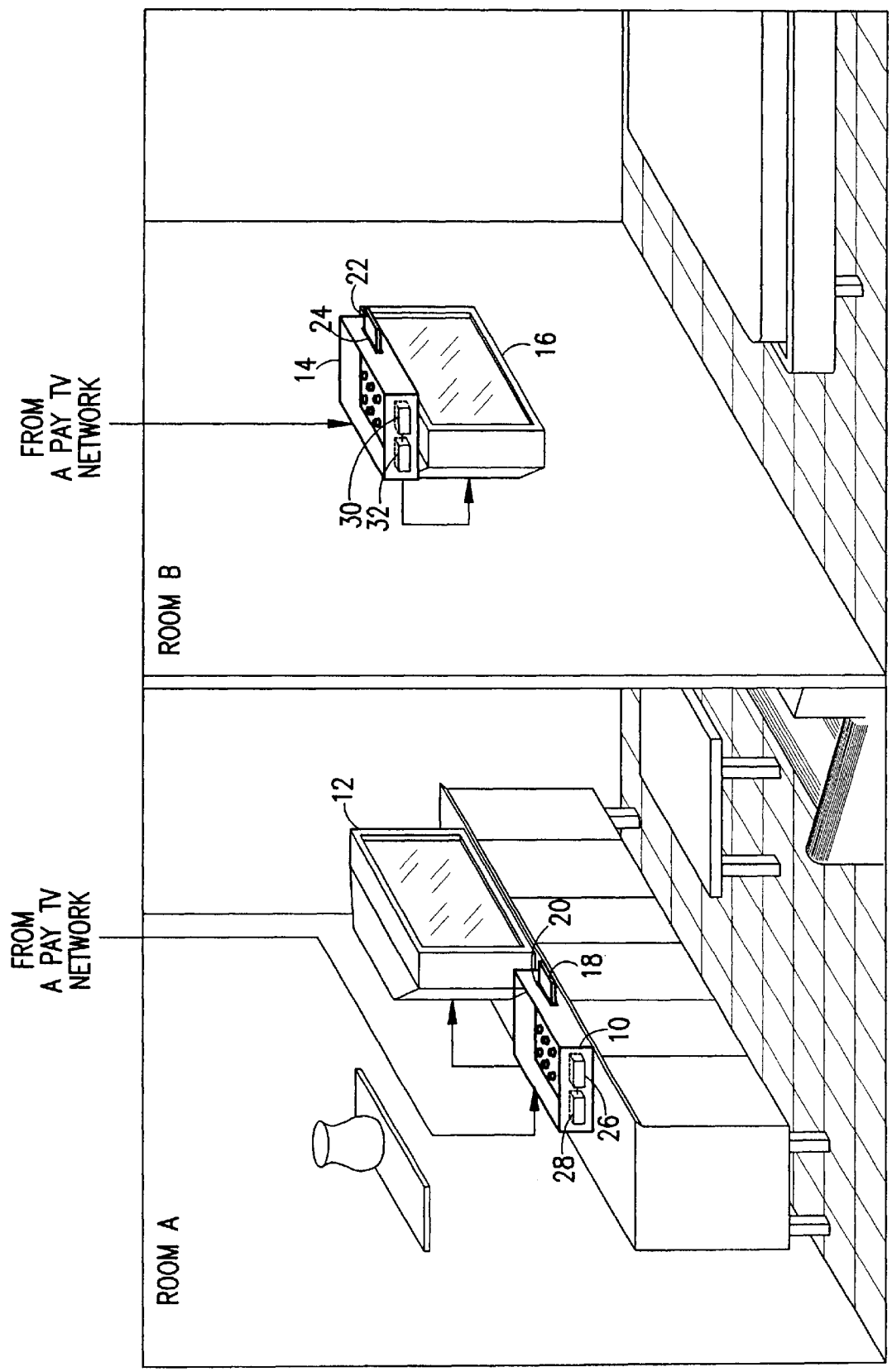
FIG. 1 is a generalized illustration of a portion of a pay television system installed at a subscriber residence and constructed and operative in accordance with a preferred embodiment of the present invention.

Reference is now made to FIG. 1, which is a generalized illustration of a portion of a pay television system constructed and operative in accordance with a preferred embodiment of the present invention.

Throughout the specification and claims the term "pay television" is used in a broad sense to include one-way and two-way cable television as well as satellite television, CATV, and pay television generally.

In the pay television system, pay television programs are transmitted to a plurality of subscriber units via a pay television network. Typically, some of the subscribers purchase more than one decoder to be installed in each room in a subscriber residence in which television sets are present. The decoders are operative to decode pay television transmissions and are each activated by a smart card.

The term "decode" in all of its forms is used throughout the specification and claims in a broad sense to cover all forms of data decoding, ranging from simple descrambling or decoding to decryption.

For the purposes of the present invention, the term "activate" in all of its forms, and taken in conjunction with a smart card, is used throughout the specification and claims to include enabling the smart card to perform access control functions which may include decoding, descrambling and decryption of information.

The term "deactivate" in all of its forms, and taken in conjunction with the smart card, is used to include preventing the smart card from performing the access control functions.

In a preferred embodiment of the present invention a subscriber unit includes a decoder 10 which is coupled to a television set 12, and a decoder 14 which is coupled to a television set 16.

Decoder 10 and television 12 are preferably placed in a room A at a subscriber residence, and decoder 14 and television 16 are placed in a room B at the subscriber residence. Decoders 10 and 14 are each operative to receive pay television transmissions from the pay television network.

Preferably, decoder 10 is activated by a smart card 18 which is inserted in a smart card slot 20 in decoder 10, and decoder 14 is activated by a smart card 22 which is inserted in a smart card slot 24 in decoder 14.

Each of smart cards 18 and 22 includes a processor (not shown) and a memory (not shown), as is well known in the art. Smart cards 18 and 22 employ information which is transmitted via the pay television network and received at the corresponding decoders 10 and 14 to generate a decoding or decryption key which is used to decode pay television transmissions. For that purpose, smart cards 18 and 22 perform an algorithm which is processed by each of the smart card processors, as is well known in the art.

Smart cards 18 and 22 communicate with the corresponding decoders 10 and 14 via smart card readers (not shown) which form part of decoders 10 and 14 respectively. When inserted in the corresponding slots 20 and 24, smart cards 18 and 22 are electrically connected to the respective smart card readers.

Preferably, decoder 10 includes a decoder processor 26 and a decoder memory 28 which is coupled to decoder processor 26. Decoder 14 includes a decoder processor 30 and a decoder memory 32 which is coupled to decoder processor 30. The smart card readers (not shown) which form part of decoders 10 and 14 are respectively coupled to decoder processors 26 and 30.

In a preferred embodiment of the present invention the smart card readers may provide information received at decoders 10 and 14 from the pay television network to smart cards 18 and 22, and may provide information read from smart cards 18 and 22 to decoders 10 and 14.

The information communicated to and from smart cards 18 and 22 may include data which is employed to generate the key, entitlements, clock data and messages such as invalidation of a card.

If one of smart cards 18 and 22 becomes invalid, the key which is generated by the corresponding smart card processor does not decode the pay television transmissions, and access to the pay television transmissions is denied. Alternatively, any other appropriate means of preventing access to the pay television transmissions may be employed such as, for example: the corresponding smart card processor may fail to generate a key; or the corresponding smart card processor may generate a key but may not communicate the generated key for further processing.

Typically, the smart cards are purchased from a pay television vendor. When purchased, the vendor typically activates the cards by passing them through an activating machine (not shown) which applies an activation algorithm. In a preferred embodiment of the present invention the cards remain active until certain predetermined criteria occur which turn the cards invalid.

Usually, purchasing a smart card is associated with a subscription to pay TV services. When the subscriber purchases more than one smart card, he typically pays less for a second subscription than for a first subscription.

Generally, a smart card is not uniquely associated with a specific decoder. Therefore, a valid smart card may activate any decoder of the type to which it fits. In such a case, there is a possibility that a subscriber may purchase several smart cards at a reduced price and sell them, at a price which is higher than the reduced price but still less than the full price, to other people. The system and method of the present invention may be employed to prevent such cases.

Figure 2A:
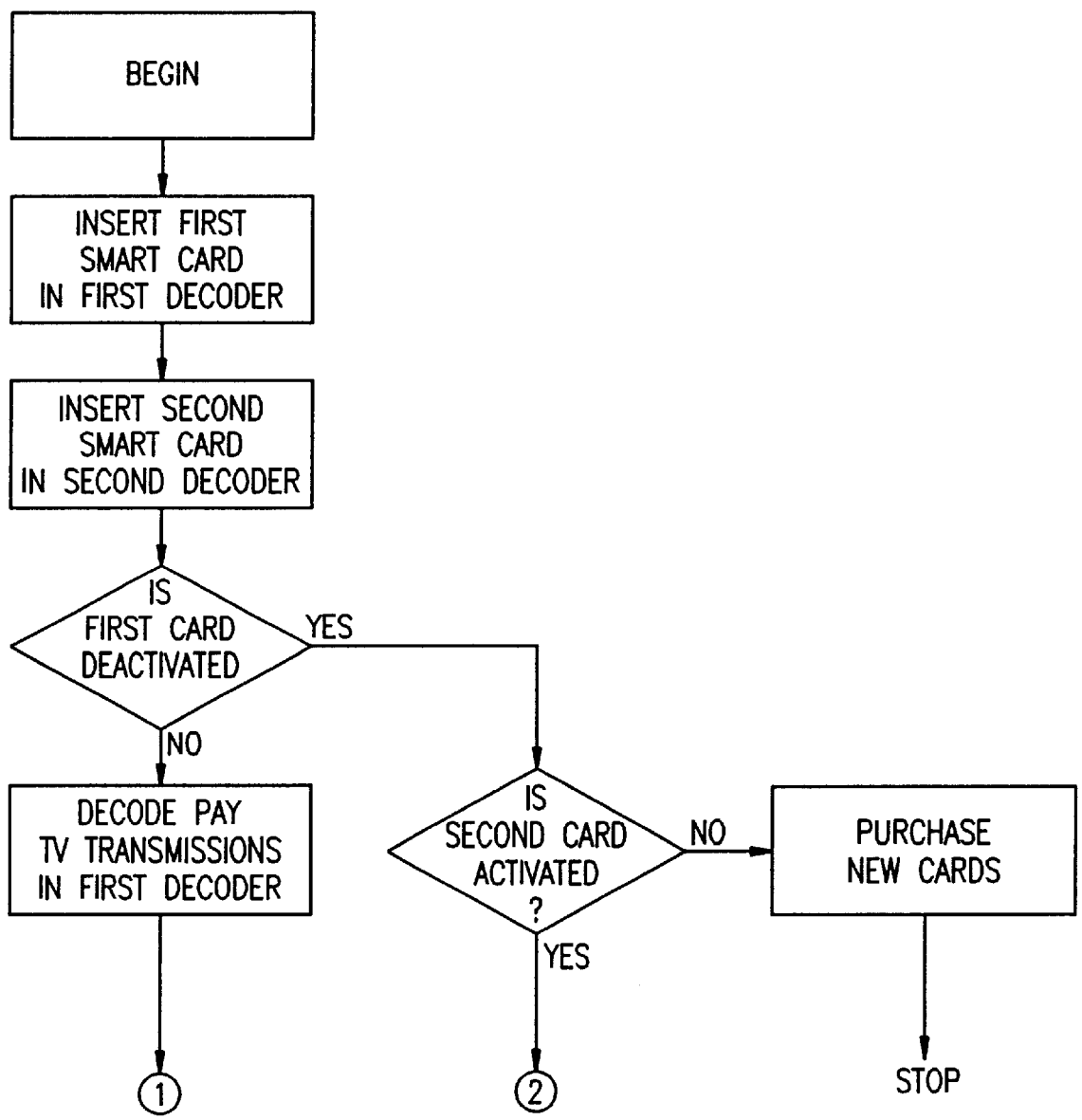
FIGS. 2A and 2B together constitute a flowchart illustrating a preferred method of operation of the system of FIG. 1 in accordance with a preferred embodiment of the present invention.
Figure 2B:
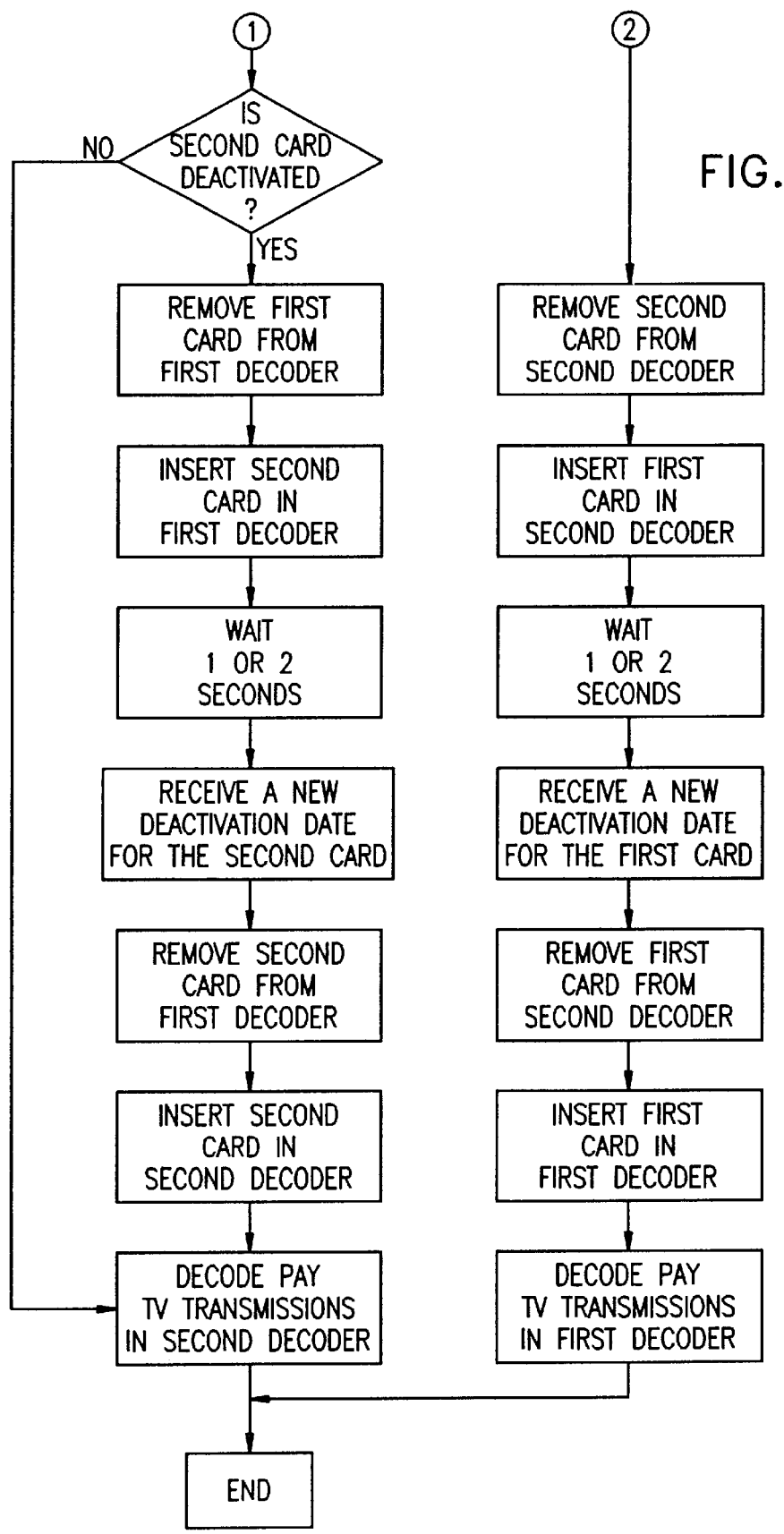

Reference is now made to FIGS. 2A and 2B which together form a flowchart illustration of a preferred method of operation of the system of FIG. 1.

In accordance with a preferred embodiment of the present invention a first smart card and a second smart card which are active, may be deactivated in accordance with predetermined criteria. Preferably, the predetermined criteria may include a predetermined date and/or a predetermined time. However, other criteria may be employed, such as number of purchases of premium programs or amount of money spent on purchases.

If the predetermined criteria include predetermined date criteria, the first smart card may include a predetermined first deactivation date and the second smart card may include a predetermined second deactivation date. Each of the deactivation dates may be stored in a memory zone in the corresponding smart card by passing the smart cards through a machine (not shown), such as the activating machine mentioned with reference to FIG. 1.

The machine, typically controlled by an algorithm in software, preferably burns data related to the deactivation dates into corresponding memory zones in the first and second smart cards. It is to be appreciated that the memories of the first and second smart cards may be of the EEPROM (Electronic Erasable Programmable Read Only Memory) type.

In another preferred embodiment of the present invention the above mentioned deactivation dates may be communicated to the first smart card and to the second smart card via the pay television network.

Preferably, the deactivation dates are maintained in terms of months or days. The first deactivation date and the second deactivation date may be different, and may be determined at time of purchase or at time of manufacture.

Generally, television programs are decoded in a first decoder and in a second decoder to which the first and second smart cards are respectively coupled until the earliest of the above mentioned deactivation dates elapses.

Assuming that the second deactivation date is earlier than the first deactivation date, the second smart card is the first to be deactivated. Deactivation of the second smart card preferably occurs when a current system date matches or exceeds the second deactivation date. The match may be found by comparison of the current system date to the deactivation date stored in the second smart card. Such comparison is typically performed in a processor which forms part of the second smart card as mentioned herein above with reference to FIG. 1.

In another preferred embodiment of the present invention the processor which forms part of the second smart card may compare the current system date with a deactivation date which is received via the pay television network.

If a match is found between the current system date and the second deactivation date, or if the current system date exceeds the second deactivation date, the second smart card preferably generates a message which is displayed on a TV to which the second decoder is coupled. The message typically indicates that the second smart card is deactivated, and programming material is not decoded. It is to be appreciated that the first smart card remains active and programming material is decoded at the first decoder.

To reactivate the second smart card, a subscriber preferably removes the first smart card from a first slot in a first card reader in the first decoder and replaces it by the second smart card.

In a preferred embodiment of the present invention, the first smart card is operative, when inserted in the first slot, to transfer to the first decoder chaining data which is used to reactivate the second smart card, and the chaining data is transferred to the second smart card when the second smart card is inserted in the first slot. Alternatively, the first decoder may be programmed to include the data required for reactivation of the second smart card at entitlement time, which may be when the first decoder and the second decoder are purchased. Further alternatively, the first decoder may include a plurality of smart card slots, and the second smart card may be inserted in an unfilled slot while the first smart card is inserted in the first slot, the chaining data being transferred from the first card to the second card via the decoder.

The chaining data may include a signature, a key or a seed which may be employed to at least one of validate, identify, verify and authenticate the second smart card. Preferably, the chaining data also includes a digital representation of a time increment which may be employed to calculate a deactivation date. The time increment is typically specified in months and days.

The signature is checked and compared for validity in a decoder processor which forms part of the first decoder, such as decoder processor 26 of FIG. 1. Alternatively, the processor which forms part of the second smart card may be operative to check validity of the signature received from the first decoder.

If validity is found, i.e. the signatures of the first smart card and the second smart card coincide, the decoder processor of the first decoder adds the time increment to the current system date to generate a new deactivation date. Preferably, the new deactivation date is stored in another memory zone in the second smart card.

Alternatively, the new deactivation date is communicated, via the pay television network, to a pay television headend (not shown), which may later use the new deactivation date to deactivate the second smart card when the new deactivation date elapses.

It is to be appreciated that a processor which forms part of the first smart card, rather than the decoder processor of the first decoder, may be operative to calculate the new deactivation date of the second smart card. In such a case the processor which forms part of the first smart card and the processor which forms part of the second smart card may communicate, via the first card reader, with a decoder memory which forms part of the first decoder, such as decoder memory 28 of FIG. 1. The decoder memory is preferably operable:

to receive from the processor which forms part of the first smart card, and to store data including the new deactivation date of the second smart card, and one of a signature, a key and a seed identifying the first smart card;

to provide the one of a signature, a key and a seed identifying the first smart card to the second smart card, when the second smart card is inserted in the first slot in the first decoder, in response to a first instruction transmitted by the second smart card; and to provide the new deactivation date to the second smart card in response to a second instruction transmitted by the second smart card.

Preferably, the second smart card transmits the second instruction to the decoder memory only if the signatures of the first smart card and the second smart card coincide. The new deactivation date which is received from the decoder memory is stored in the second smart card.

In another preferred embodiment of the present invention the new deactivation date is calculated in a headend processor which is located at the headend of the pay television system, and the headend rather than the first smart card provides the new deactivation date to the decoder memory.

After the new deactivation date is stored in the second smart card, the decoder processor of the first decoder provides the second smart card an instruction which reactivates the second smart card. Alternatively, the decoder processor of the first decoder informs the headend that a new deactivation date is stored in the second smart card, and the headend transmits an instruction which reactivates the second smart card.

After the second smart card is reactivated, it may be removed from the first slot in the first decoder and inserted in the second decoder. Since the second smart card is reactivated, the pay television programs are decoded.

It is to be appreciated that various algorithms may be applied to calculate the new deactivation date. Such algorithms may include adding multiple time increments to the current system date, and adding a constant number of hours to the time increment to achieve deactivation at any selected time of a day.

In a preferred embodiment of the present invention the time increment may be modified by the decoder processor of the first decoder or programmed by the manufacturer or the pay television vendor. Preferably, variable time increments may be stored in the decoder memory which may be controlled by the decoder processor of the first decoder.

It is to be appreciated that the first and second smart cards are preferably linked together at entitlement time and thus the first smart card recognizes the signature of the second smart card and vice versa. If the chaining data is provided by a decoder rather than by a smart card, then the first and second decoders are preferably linked together at entitlement time, and the first and second smart cards receive the chaining data from the first and second decoders respectively when inserted in the respective decoders for the first time.

The new deactivation date may be later than the deactivation date of the first smart card. In such a case, when the deactivation date of the first smart card elapses and the first smart card is deactivated, the second smart card may reactivate the first smart card.

The above mentioned procedure is a chaining procedure which may be repeated many times, and for long periods. In such a procedure, each card may reactivate any number of cards which are linked thereto. It is to be appreciated that reactivation of a card may take less than a second, or a few seconds if communication with the headend is required as described herein above.

In a preferred embodiment of the present invention the two cards, i.e. the first smart card and the second smart card, are interchangeable, and the chaining procedure may initiate with the deactivation of the first smart card rather than the deactivation of the second smart card. It is to be appreciated that the first decoder and the second decoder are also interchangeable.

In another preferred embodiment of the present invention, the first smart card may reactivate the second smart card twice, three times, or more before the first smart card is reactivated. The time increment may be calculated so that no two chained cards deactivate at the same time. If such a principle is maintained, an active card in the chained cards may always reactivate a deactivated chained card.

The above mentioned chaining procedure gives the subscriber a very strong incentive to maintain both the first and second smart cards, and all cards chained to the first and second smart cards which he purchases from the vendor, in his residence in order to physically chain the cards at particular time periods. This makes it difficult, if not impossible, for the subscriber to sell one or more of the cards to another person.

In a preferred embodiment of the present invention the first and second smart cards may be also employed to control access to a VCR (Video Cassette Recorder) to allow or prevent recording of television programs. In such a case, when one of the cards is deactivated, television programs are not decoded and the VCR may record only non-intelligible material.

In another preferred embodiment of the present invention, the subscriber may postpone deactivation of a card whose deactivation date has elapsed for a period of a few hours by, for example, pressing a key (not shown) in a remote control (not shown) to prevent deactivation while he views a selected program. In such a case, the decoder processor of the first decoder, or the processor which forms part of the second smart card, may add a constant time increment, such as an hour, to the elapsed second deactivation date.

It is also to be appreciated that deactivation dates may be specified in hours, as well as in months and days, and deactivation may be selected to occur late at night or at other times of day at which television programs are not typically viewed.

Preferably, the chaining data for reactivation of a card is not transferred before a deactivation time elapses. Thus, if the subscriber inserts the second smart card in the first slot before the second smart card is deactivated, no reactivation occurs.

Typically, there is a time delay between manufacturing of cards and sale of the cards to a subscriber. Since deactivation dates may be pre-selected at manufacturing time, such time delay may result in deactivation of the cards before the cards are purchased. In such a case, when a card is purchased, a new deactivation date may be calculated based on the current system time, and different time increments may be applied to each card.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

What is claimed is:

1. A pay television subscriber system for use with a pay television network, the subscriber system comprising:

a subscriber unit which receives pay television transmissions via the pay television network and displays the pay television transmissions on televisions operatively associated therewith, the subscriber unit including at least two pay television decoders, wherein a first decoder includes a first card reader and a second decoder includes a second card reader;

a first smart card which is operative, upon insertion in a first slot in the first card reader, to activate decoding of the pay television transmissions in the first decoder; and a second smart card which is operative, upon insertion in a second slot in the second card reader, to activate decoding of the pay television transmissions in the second decoder, wherein said second smart card deactivates in accordance with predetermined criteria and reactivates upon insertion in said first slot in the first card reader after removal of said first smart card from the first card reader, and said first smart card deactivates in accordance with second predetermined criteria and reactivates upon insertion in said second slot in the second card reader after removal of said second card from the second card reader.

2. A pay television subscriber system comprising:

a subscriber unit which receives pay television transmissions via the pay television network and displays the pay television transmissions on televisions operatively associated therewith, the subscriber unit including at least two pay television decoders, wherein a first decoder includes a first card reader and at least one additional card reader, and a second decoder includes a second card reader;

a first smart card which is operative, upon insertion in a first slot in the first card reader, to activate decoding of the pay television transmissions in the first decoder; and a second smart card which is operative, upon insertion in a second slot in the second card reader, to activate decoding of the pay television transmissions in the second decoder, wherein said second smart card deactivates in accordance with predetermined criteria and reactivates upon insertion in an additional slot in the additional card reader, and said first smart card deactivates in accordance with second predetermined criteria and reactivates upon insertion of said second smart card in said additional slot in the additional card reader.

3. A system according to claim 1 and wherein said predetermined criteria include at least one of a predetermined time and a predetermined date.

4. A system according to claim 2 and wherein said predetermined criteria include at least one of a predetermined time and a predetermined date.

5. A system according to claim 1 and wherein said predetermined criteria include a predetermined date, and said first smart card deactivates at a first deactivation date, said second smart card deactivates at a second deactivation date, and said first deactivation date is later than said second deactivation date.

6. A system according to claim 2 and wherein said predetermined criteria include a predetermined date, and said first smart card deactivates at a first deactivation date, said second smart card deactivates at a second deactivation date, and said first deactivation date is later than said second deactivation date.

7. A system according to claim 1 and wherein at least one of said first smart card and said second smart card is also operable to control access to a video-cassette-recorder for recording pay television transmissions.

8. A system according to claim 2 and wherein at least one of said first smart card and said second smart card is also operable to control access to a video-cassette-recorder for recording pay television transmissions.

9. A system according to claim 5 and wherein said second smart card receives, upon reactivation, a new deactivation date which is later than said second deactivation date.

10. A system according to claim 9 and wherein said new deactivation date is provided by one of said first decoder, said first smart card and a pay television headend.

11. A system according to claim 10 and wherein said new deactivation date is provided by adding a time increment to a current system time, and calculation of said new deactivation date is performed at one of said first decoder, said first smart card, and the pay television headend.

12. A system according to claim 1 and wherein reactivation of said second smart card includes transmission of chaining data, said chaining data including one of a signature, a key and a seed which is employed to at least one of validate, identify, verify and authenticate said second smart card.

13. A system according to claim 2 and wherein reactivation of said second smart card includes transmission of chaining data, said chaining data including one of a signature, a key and a seed which is employed to at least one of validate, identify, verify and authenticate said second smart card.

14. A system according to claim 12 and wherein said chaining data also includes a digital representation of a time increment which is associated with a current system time to provide a deactivation date.

15. A system according to claim 12 and wherein said one of a signature, a key and a seed is identical for the first smart card and for the second smart card.

16. A system according to claim 1 and wherein said predetermined criteria include a predetermined date, and said second smart card is deactivated at any time of day during said predetermined date.

17. A system according to claim 1 and wherein said first smart card and said second smart card are interchangeable.

18. A system according to claim 2 and wherein said predetermined criteria include a predetermined date, and said second smart card is deactivated at any time of day during said predetermined date.

19. A system according to claim 2 and wherein said first smart card and said second smart card are interchangeable.

20. A pay television decoder comprising:
a smart card reader including a smart card slot via which a first smart card is read; and
a decoder memory, operatively associated with said smart card reader, which is operable:
to store a deactivation date of a second smart card, and one of a signature, a key and a seed identifying said first smart card,
to provide said one of a signature, a key and a seed identifying said first smart card to said second smart card, when said second smart card is inserted in said smart card slot in said smart card reader, in response to a first instruction transmitted by the second smart card, and
to provide said deactivation date to said second smart card in response to a second instruction transmitted by the second smart card.

21. A decoder according to claim 20 and wherein said second instruction is transmitted in response to a match between said one of a signature, a key and a seed identifying said first smart card, and a corresponding one of a signature, a key and a seed identifying said second smart card.

22. In a pay television system in which pay television programs are transmitted to a plurality of subscribers, each subscriber being entitled to receive selected programs, a pay television access control method comprising:
providing a first decoder activated by a first smart card to decode pay television transmissions, and a second decoder activated by a second smart card to decode pay television transmissions;
deactivating said second smart card in accordance with predetermined criteria;
removing said first smart card from a first card reader in said first decoder;
reactivating said second smart card by inserting said second smart card in said first card reader of said first decoder;
deactivating said first smart card in accordance with second predetermined criteria; and
reactivating said first smart card upon insertion in a second card reader in said second decoder after removal of said second card from the second card reader.

23. In a pay television system in which pay television programs are transmitted to a plurality of subscribers, each subscriber being entitled to receive selected programs, a pay television access control method comprising:
providing a first decoder activated by a first smart card to decode pay television transmissions, and a second decoder activated by a second smart card to decode pay television transmissions, wherein the first decoder includes a first card reader and a second card reader;
deactivating said second smart card in accordance with predetermined criteria;
inserting said first smart card in said first card reader;
reactivating said second smart card by inserting said second smart card in said second card reader;
deactivating said first smart card in accordance with second predetermined criteria; and
reactivating said first smart card by inserting said second smart card in said second smart card reader.

24. A method according to claim 22 and wherein said predetermined criteria include at least one of a predetermined time and a predetermined date.

25. A method according to claim 22 and wherein the predetermined criteria include a predetermined date, and the method comprises deactivating said first smart card at a first deactivation date, and deactivating said second smart card at a second deactivation date, wherein said first deactivation date is later than said second deactivation date.

26. A method according to claim 22 and comprising supplying a new deactivation date to said second smart card upon reactivation.

27. A method according to claim 23 and wherein said predetermined criteria include at least one of a predetermined time and a predetermined date.

28. A method according to claim 23 and wherein the predetermined criteria include a predetermined date, and the method comprises deactivating said first smart card at a first deactivation date, and deactivating said second smart card at a second deactivation date, wherein said first deactivation date is later than said second deactivation date.

29. A method according to claim 23 and comprising supplying a new deactivation date to said second smart card upon reactivation.

30. A method according to claim 29 and wherein said supplying includes adding a time increment to a current system time.

31. A pay television access control method comprising:
   providing, in a pay television decoder, a smart card reader including a smart card slot via which a first smart card is read, and a decoder memory operatively associated with said smart card reader;
   storing, in said decoder memory, a deactivation date of a second smart card, and one of a signature, a key and a seed identifying said first smart card;
   inserting said second smart card in said smart card slot in said smart card reader;
   supplying said one of a signature, a key and a seed identifying said first smart card to said second smart card in response to a first instruction transmitted by the second smart card; and
   transmitting said deactivation date to said second smart card in response to a second instruction generated by the second smart card.

32. A pay television access control method comprising:
   providing a decoder including a decoder memory and a smart card reader;
   inserting a first smart card in said smart card reader;
   transferring, from said first smart card to said decoder memory, chaining data for activating a second smart card;
   removing said first smart card from said smart card reader;
   inserting said second smart card in said smart card reader;
   transmitting, from said decoder memory to said second smart card, said chaining data; and
   enabling said chaining data to activate said second smart card.

33. A system according to claim 1 and wherein said predetermined criteria include a number of times premium programs have been purchased before deactivation of said second smart card.

34. A method according to claim 22 and wherein said predetermined criteria include a number of times premium programs have been purchased before deactivation of said second smart card.

35. A method according to claim 23 and wherein said predetermined criteria include a number of times premium programs have been purchased before deactivation of said second smart card.

36. A system according to claim 11 and wherein the calculation of said new deactivation date includes adding a constant number of hours to the time increment so as to achieve deactivation at a selected time of a day.

37. A method according to claim 30 and wherein said supplying includes adding a predetermined constant number of hours to the time increment.

38. A system according to claim 11 and wherein the time increment is modifiable.

39. A method according to claim 30 and wherein the time increment is modifiable.

40. A method according to claim 30 and comprising postponing deactivation of the second smart card for a predetermined time by operating a key in a remote control.

41. A system according to claim 11 and wherein said time increment is specified in at least one of hours, days and months.

42. A chaining method for use with a plurality of smart cards, the method comprising:
   providing a plurality of decoders, each including a smart card reader;
   inserting a smart card in each smart card reader;
   deactivating at least some of the plurality of decoders in accordance with predetermined criteria while maintaining at least one decoder activated;
   removing a smart card associated with said one activated decoder from a smart card reader associated with said one activated decoder;
   removing smart cards associated with said some of the plurality of decoders from corresponding smart card readers associated with said some of the plurality of decoders;
   separately inserting each of said smart cards associated with said some of the plurality of decoders in said smart card reader associated with said one activated decoder; and
   activating at least one of said smart cards associated with said some of the plurality of decoders upon insertion in said smart card reader associated with said one activated decoder,
   wherein said step of inserting a smart card in each smart card reader comprises transferring chaining data from each smart card to each corresponding smart card readers and said activating step comprises:
     separately transmitting first chaining data from said one activated decoder to each of said smart cards associated with said some of the plurality of decoders; and
     separately enabling said first chaining data to activate each of said smart cards associated with said some of the plurality of decoders.

43. A pay television decoder for use with a subscriber system for use with a pay television network, the subscriber system comprising a subscriber unit which receives pay television transmissions via the pay television network and displays the pay television transmissions on televisions operatively associated therewith, the subscriber unit including at least two pay television decoders, wherein a first decoder includes a first card reader and a second decoder includes a second card reader, a first smart card being operative, upon insertion in a first slot in the first card reader, to activate decoding of the pay television transmissions in the first decoder and a second smart card being operative, upon insertion in a second slot in the second card reader, to activate decoding of the pay television transmissions in the second decoder, the pay television decoder comprising:

a first card reader having a first slot, wherein said second smart card deactivates in accordance with predetermined criteria and reactivates upon insertion in said first slot in the first card reader after removal of said first smart card from the first card reader, and said first smart card deactivates in accordance with second predetermined criteria and reactivates upon insertion in said second slot in the second card reader after removal of said second card from the second card reader.

44. A pay television decoder for use with subscriber system for use with a pay television network, the subscriber system comprising a subscriber unit which receives pay television transmissions via the pay television network and displays the pay television transmissions on televisions operatively associated therewith, the subscriber unit including at least two pay television decoders, wherein a first decoder includes a first card reader and at least one additional card reader, and a second decoder includes a second card reader, a first smart card being operative, upon insertion in a first slot in the first card reader, to activate decoding of the pay television transmissions in the first decoder and a second smart card being operative, upon insertion in a second slot in the second card reader, to activate decoding of the pay television transmissions in the second decoder, the pay television decoder comprising:

a first card reader having a first slot; and at least one additional card reader having an additional slot, wherein said second smart card deactivates in accordance with predetermined criteria and reactivates upon insertion in the additional slot in the additional card reader, and said first smart card deactivates in accordance with second predetermined criteria and reactivates upon insertion of said second smart card in said additional slot in the additional card reader.

45. A pay television subscriber system for use with a pay television network, the subscriber system comprising:

a subscriber unit which receives pay television transmissions via the pay television network and displays the pay television transmissions on televisions operatively associated therewith, the subscriber unit including at least two pay television decoders, at least one of the two pay television decoders comprising:

a smart card reader including a smart card slot via which a first smart card is read; and a decoder memory, operatively associated with said smart card reader, which is operable:

to store a deactivation date of a second smart card, and one of a signature, a key and a seed identifying said first smart card, to provide said one of a signature, a key and a seed identifying said first smart card to said second smart card, when said second smart card is inserted in said smart card slot in said smart card reader, in response to a first instruction transmitted by the second smart card, and to provide said deactivation date to said second smart card in response to a second instruction transmitted by the second smart card.

46. A pay television decoder comprising:

a decoder memory; and a smart card reader, wherein, when a first smart card is inserted in said smart card reader, said decoder is operative to transfer, from said first smart card to said decoder memory, chaining data for activating a second smart card, and when said first smart card is removed from said smart card reader and said second smart card is inserted therein, said decoder is operative to transmit, from said decoder memory to said second smart card, said chaining data, and said chaining data activates said second smart card.

47. A pay television subscriber system for use with a pay television network, the subscriber system comprising:

a subscriber unit which receives pay television transmissions via the pay television network and displays the pay television transmissions on televisions operatively associated therewith, the subscriber unit including at least two pay television decoders, at least one of the two pay television decoders comprising:

a decoder memory; and a smart card reader, wherein, when a first smart card is inserted in said smart card reader, said decoder is operative to transfer, from said first smart card to said decoder memory, chaining data for activating a second smart card, and when said first smart card is removed from said smart card reader and said second smart card is inserted therein, said decoder is operative to transmit, from said decoder memory to said second smart card, said chaining data, and said chaining data activates said second smart card.

48. A pay television subscriber system for use with a plurality of smart cards, the system comprising:

a subscriber unit which receives pay television transmissions via a pay television network and displays the pay television transmissions on televisions operatively associated therewith, the subscriber unit including a plurality of decoders, each including a smart card reader operative to receive a smart card, said smart card being inserted into said smart card reader, wherein at least some of the plurality of decoders deactivate in accordance with predetermined criteria while maintaining at least one decoder activated, and upon removing a smart card associated with said one activated decoder from a smart card reader associated with said one activated decoder, removing smart cards associated with said some of the plurality of decoders from corresponding smart card readers associated with said some of the plurality of decoders and separately inserting each of said smart cards associated with said some of the plurality of decoders in said smart card reader associated with said one activated decoder, at least one of said smart cards associated with said some of the plurality of decoders is activated upon insertion in said smart card reader associated with said one activated decoder, and when said smart card is inserted into said smart card reader chaining data is transferred from each smart card to each corresponding smart card reader, and said at least one of said smart cards is activated by:
separately transmitting first chaining data from said one activated decoder to each of said smart cards associated with said some of the plurality of decoders; and
separately enabling said first chaining data to activate each of said smart cards associated with said some of the plurality of decoders.

49. A smart card chaining method comprising:
providing a plurality of smart cards comprising at least a first smart card and a second smart card;
deactivating the first smart card in accordance with at least a first predetermined criterion;
reactivating the first smart card by sending a first message from the second smart card to the first smart card; and
after the deactivating the first smart card and the reactivating the first smart card:
deactivating the second smart card in accordance with at least a second predetermined criterion; and
reactivating the second smart card by sending a second message from the first smart card to the second smart card.

50. The method according to claim 49 and wherein at least one of the first message and the second message comprises chaining data.

* * * * *